United States Patent
Matsumura et al.

(10) Patent No.: US 10,020,653 B2
(45) Date of Patent: Jul. 10, 2018

(54) STATION-BUILDING POWER SUPPLY DEVICE

(71) Applicant: MITSUBISHI ELECTRIC CORPORATION, Chiyoda-ku, Tokyo (JP)

(72) Inventors: Yasushi Matsumura, Tokyo (JP); Takeshi Tanaka, Tokyo (JP); Wataru Okuda, Tokyo (JP); Shuji Ishikura, Tokyo, PA (US)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 69 days.

(21) Appl. No.: 15/032,429

(22) PCT Filed: Nov. 28, 2013

(86) PCT No.: PCT/JP2013/082109
§ 371 (c)(1),
(2) Date: Apr. 27, 2016

(87) PCT Pub. No.: WO2015/079544
PCT Pub. Date: Jun. 4, 2015

(65) Prior Publication Data
US 2016/0268803 A1    Sep. 15, 2016

(51) Int. Cl.
*H02J 3/00* (2006.01)
*B60M 3/06* (2006.01)
(Continued)

(52) U.S. Cl.
CPC .............. *H02J 3/00* (2013.01); *B60M 3/06* (2013.01); *H02M 3/04* (2013.01); *H02M 7/44* (2013.01)

(58) Field of Classification Search
CPC .... H02J 3/00; H02J 3/28; B60M 3/02; B60M 3/06
(Continued)

(56) References Cited

U.S. PATENT DOCUMENTS

| 8,598,739 B2 | 12/2013 | Tsutsumi et al. |
| 2014/0055080 A1* | 2/2014 | Ishikura .................. B60M 3/00 320/103 |

(Continued)

FOREIGN PATENT DOCUMENTS

| CN | 103347733 A | 10/2013 |
| EP | 1 538 020 A3 | 6/2005 |

(Continued)

OTHER PUBLICATIONS

Australian Office Action dated Aug. 24, 2016 issued in corresponding Australian Patent Appln. No. 2013406324 (3 pages).
(Continued)

*Primary Examiner* — John Poos
(74) *Attorney, Agent, or Firm* — Buchanan Ingersoll & Rooney PC

(57) ABSTRACT

The station-building power supply device includes a capacitor unit that stores therein surplus regenerative power, a first power conversion unit that performs DC/DC power conversion, and a second power conversion unit that converts DC power. A first voltage threshold for detecting the occurrence of surplus regenerative power is set and a first SOC threshold for detecting whether the capacitor unit can discharge is set. The first power conversion unit is controlled such that power is supplied from the feeder to the capacitor unit to charge the capacitor unit when the feeding voltage exceeds the first voltage threshold, and the second power conversion unit is controlled such that power is supplied from the
(Continued)

capacitor unit to the station loads when the SOC of the capacitor unit exceeds the first SOC threshold.

5 Claims, 3 Drawing Sheets

(51) Int. Cl.
*H02M 3/04* (2006.01)
*H02M 7/44* (2006.01)

(58) Field of Classification Search
USPC .............................................. 307/19, 26, 48
See application file for complete search history.

(56) References Cited

U.S. PATENT DOCUMENTS

| 2014/0070770 | A1 | 3/2014 | Nogi et al. | |
|---|---|---|---|---|
| 2015/0207329 | A1* | 7/2015 | Tanaka | H02J 3/04 307/20 |
| 2015/0261247 | A1* | 9/2015 | Tanaka | H02J 9/062 307/24 |

FOREIGN PATENT DOCUMENTS

| EP | 1985490 | A1 | 10/2008 | | |
|---|---|---|---|---|---|
| EP | 2426570 | A1 | 3/2012 | | |
| JP | 2001-347857 | A | 12/2001 | | |
| JP | 2005-162076 | A | 6/2005 | | |
| JP | 2006-062427 | A | 3/2006 | | |
| JP | 2009-241677 | A | 10/2009 | | |
| JP | 2010-000810 | A | 1/2010 | | |
| JP | 2010-011711 | A | 1/2010 | | |
| JP | 4432675 | B2 | 3/2010 | | |
| JP | 2010-098866 | A | 4/2010 | | |
| JP | 2011-126370 | A | 6/2011 | | |
| JP | 2013-023074 | A | 2/2013 | | |
| JP | 2013-095265 | A | 5/2013 | | |
| WO | WO 2009/107715 | A1 | 9/2009 | | |
| WO | WO 2012/144079 | | * | 4/2011 | ................ H02J 7/34 |

OTHER PUBLICATIONS

International Search Report (PCT/ISA/210) dated Dec. 24, 2013, by the Japanese Patent Office as the International Searching Authority for International Application No. PCT/JP2013/082109.

Written Opinion (PCT/ISA/237) dated Dec. 24, 2013, by the Japanese Patent Office as the International Searching Authority for International Application No. PCT/JP2013/082109.

Japanese Office Action for Application No. 2012-182283 dated Jan. 13, 2013 (with English translation, 4 pages).

Office Action dated Mar. 17, 2017, by the Chinese Patent Office in corresponding Chinese Patent Application No. 201380081218.8 and partial English translation of the Office Action. (11 pages).

Extended European Search Report dated May 23, 2017, issued by the European Patent Office in corresponding European Application No. 13898230.1. (6 pages).

Office Action dated Oct. 30, 2017, by the Chinese Patent Office in corresponding Chinese Patent Application No. 201380081218.8 and English translation of the Office Action. (Machine Translation, 20 pages total).

European Search Report dated Dec. 19, 2017, from corresponding European Patent Application No. 17193969.7 (8 Pages).

* cited by examiner

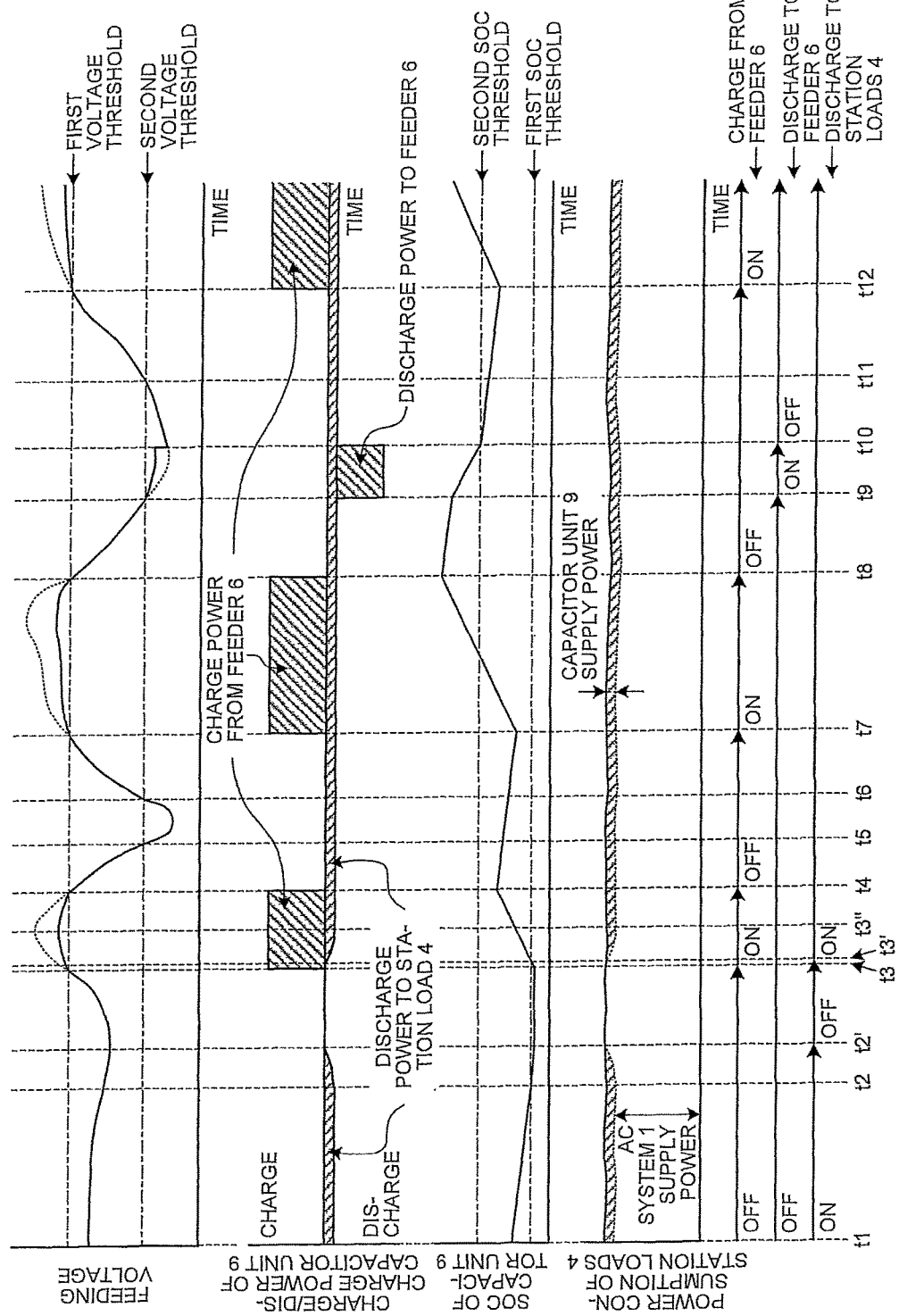

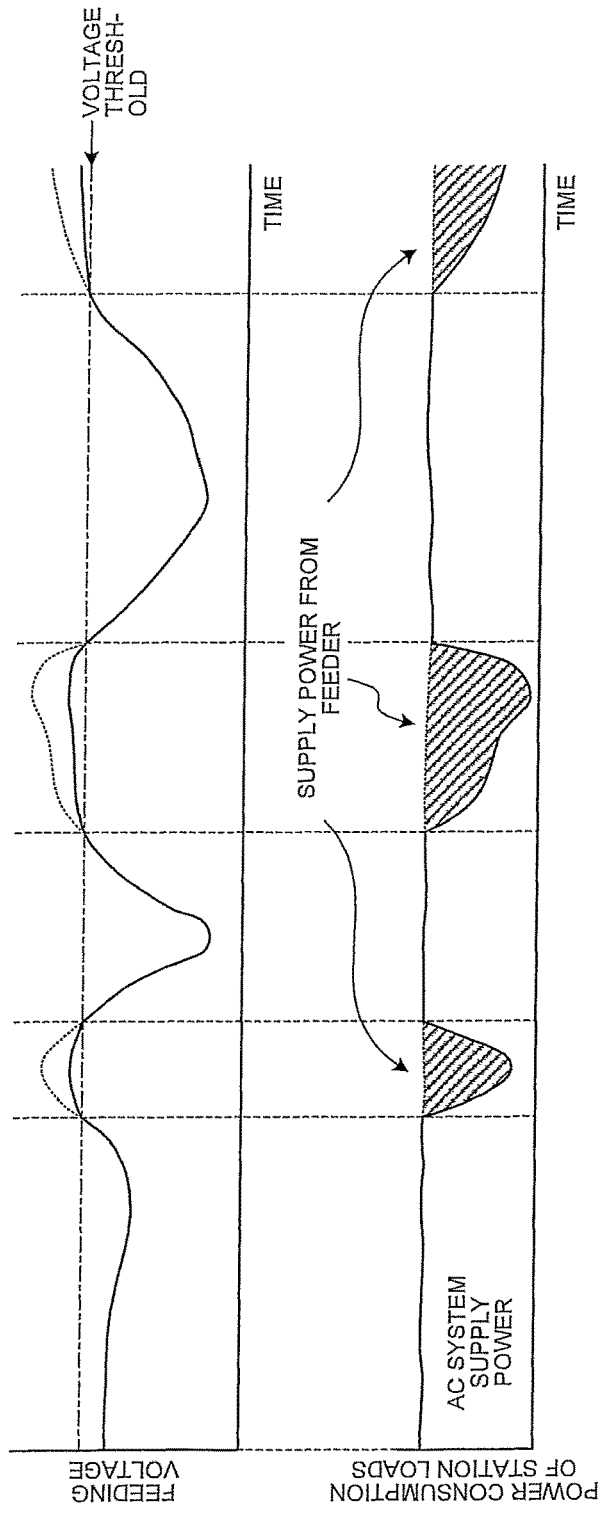

STATION-BUILDING POWER SUPPLY DEVICE

FIELD

The present invention relates to a station-building power supply device that supplies power to electrical facilities (hereinafter, "station load") such as an air-conditioning system, a lighting system, and an elevator in a station yard using both AC power supplied from an AC system and the surplus regenerative power of trains.

BACKGROUND

In recent years, regenerative power generated by regenerative brakes of trains is used as running power for other trains via a feeder in a DC feeding network. In such a DC feeding network, a feeding voltage increases when the regenerative power exceeds the running power in the same transformation zone, and the feeding voltage decreases when the regenerative power falls below the running power. For example, a conventional technique has been disclosed in which the surplus regenerative power occurring when regenerative power exceeds running power is transformed into AC power to be supplied to a station load via an AC system, the power that exceeds the consumption power for the station load is stored in a secondary battery, and the secondary battery is discharged when a feeding voltage is decreased to supply DC power to a feeder, thereby stabilizing the feeding voltage and also effectively using the surplus regenerative power to an extent that prevents a reverse power from flowing to the AC system (for example, Patent Literature 1).

CITATION LIST

Patent Literature

Patent Literature 1: Japanese Patent No. 4432675

SUMMARY

Technical Problem

However, in the conventional technique listed above, power is regenerated to send to the AC system connected to the station load when surplus regenerative power occurs. Therefore, there is a problem in that a power amount of the AC system fluctuates intermittently and is destabilized.

The present invention has been achieved in view of the above problem, and an objective of the present invention is to provide a station-building power supply device that can effectively use surplus regenerative power while suppressing fluctuations in the power amount of an AC system that supplies AC power to a station load.

Solution to Problem

In order to solve the problem and achieve the objective, the present invention relates to a station-building power supply device that supplies power to a station load using both AC power supplied from an AC system and surplus regenerative power generated by trains. The station-building power supply device includes a feeding-voltage detection unit that detects a feeding voltage; a capacitor unit that stores therein the surplus regenerative power; an SOC (State Of Charge) detection unit that detects an SOC of the capacitor unit; a first power conversion unit that performs DC/DC power conversion in both directions between a feeder and the capacitor unit; a second power conversion unit that converts DC power supplied from the capacitor unit to AC power and supplies the AC power to the station load; and a control unit that controls the first power conversion unit and the second power conversion unit on the basis of the feeding voltage and the SOC. The control unit controls the first power conversion unit such that power is supplied from the feeder to the capacitor unit when the feeding voltage exceeds a predetermined first voltage threshold, and controls the second power conversion unit such that power is supplied from the capacitor unit to the station load when the SOC exceeds a predetermined first SOC threshold.

Advantageous Effects of Invention

According to the present invention, surplus regenerative power can be effectively used while suppressing fluctuations in the power amount of an AC system that supplies AC power to a station load.

BRIEF DESCRIPTION OF DRAWINGS

FIGS. 2(*a-d*) are diagrams illustrating an example of time charts of the station-building power supply device according to the embodiment.

FIGS. 3(*a-b*) are diagrams illustrating an example of time charts of a conventional station-building power supply device not including a capacitor unit that stores therein surplus regenerative power.

DESCRIPTION OF EMBODIMENTS

Figure 1:
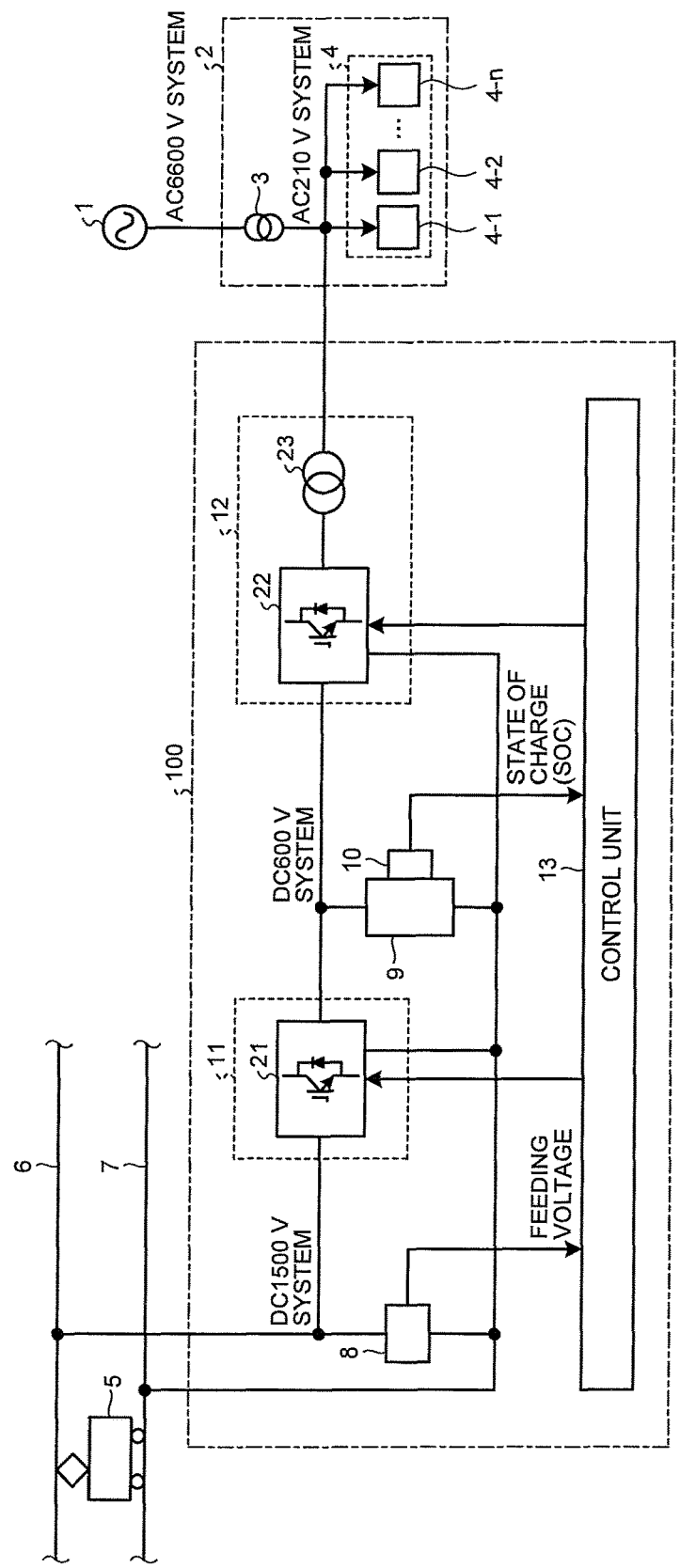
FIG. 1 is a diagram illustrating an example configuration of a station-building power supply device according to an embodiment.

Exemplary embodiments of a station-building power supply device according to the present invention will be explained below in detail with reference to the accompanying drawings. The present invention is not limited to the embodiments.

Embodiment

FIG. 1 is a diagram illustrating an example configuration of a station-building power supply device according to an embodiment of the present invention. In a station building 2, a transformer 3 that transforms high-voltage AC power supplied from an AC system 1 (an AC6600 V system in this example) into low-voltage AC power (an AC210 V system in this example) is provided in a station electrical room (not illustrated) or the like, and power is supplied to electrical facilities 4-1, 4-2, . . . and 4-*n* (hereinafter, "station loads 4") such as an air-conditioning system, a lighting system, and an elevator in the station yard. A station-building power supply device 100 according to the present embodiment is configured to transform surplus regenerative power that has not been consumed in an electrical transformation zone in which trains 5 run into low-voltage AC power and to supply the AC power to the station loads 4. That is, the station loads 4 are supplied with both the AC power supplied from the AC system 1 and the surplus regenerative power in the electrical transformation zone.

As illustrated in FIG. 1, the station-building power supply device 100 according to the present embodiment includes a feeding-voltage detection unit 8 that detects a feeding voltage (a DC1500 V system, in this example) between a feeder 6 and a rail 7; a capacitor unit 9 that stores therein the surplus regenerative power generated in the electrical transformation zone in which the trains 5 run; an SOC detection unit 10 that detects an SOC (State Of Charge) of the capacitor unit 9; a first power conversion unit 11 including a bidirectional DC/DC converter 21 that performs DC/DC power conversion in both directions between the feeder 6 and the capacitor unit 9; a second power conversion unit 12 including an inverter 22 that converts DC power supplied from the capacitor unit 9 to AC power and a transformer 23 that converts an output from the inverter 22 into AC power (the AC210 V system in this example) to be supplied to the station loads 4; and a control unit 13 that controls the first power conversion unit 11 and the second power conversion unit 12 on the basis of the feeding voltage and the SOC of the capacitor unit 9. A known method can be used by the SOC detection unit 10 as a method of detecting the SOC, and the present invention is not limited by the method of detecting the SOC. In addition, the present invention is not limited by the circuit configuration of the bidirectional DC/DC converter 21 that constitutes the first power conversion unit 11 nor by the circuit configuration of the inverter 22 that constitutes the second power conversion unit 12.

The operational concept of the station-building power supply device 100 according to the present embodiment is described next with reference to FIG. 1. In the present embodiment, a voltage threshold (a first voltage threshold) for the feeding voltage and an SOC (State Of Charge) threshold (a first SOC threshold) for the SOC of the capacitor unit 9 are set.

A value that indicates the occurrence of surplus regenerative power in the electrical transformation zone is set as the first voltage threshold and, when the feeding voltage exceeds the first voltage threshold, the control unit 13 controls the first power conversion unit 11 such that power is supplied from the feeder 6 to the capacitor unit 9, thereby charging the capacitor unit 9.

A value for indicating whether the capacitor unit 9 can discharge is set as the first SOC threshold, and when the SOC of the capacitor unit 9 exceeds the first SOC threshold, the control unit 13 controls the second power conversion unit 12 such that it supplies power from the capacitor unit 9 to the station loads 4.

By performing such control as mentioned above, each time generation of surplus regenerative power in the electrical transformation zone occurs, the capacitor unit 9 is charged with the surplus regenerative power, and power supplied continuously from the AC system 1 to the station loads 4 can be supplemented with the surplus regenerative power charged in the capacitor unit 9, while the capacitor unit 9 maintains an SOC that enables discharging. Thus, the surplus regenerative power can be effectively used while fluctuations in the voltage of the feeder 6 and fluctuations in the amount of power supplied from the AC system 1 are reduced.

The second power conversion unit 12 is also controlled so as to cause the amount of power supplied from the capacitor unit 9 to the station loads 4 to be substantially constant and accordingly the amount of power supplied from the AC system 1 can be more stable.

Furthermore, a second voltage threshold smaller than the first voltage threshold can be provided for the feeding voltage, and a second SOC threshold larger than the first SOC threshold can be provided for the SOC of the capacitor unit 9. A value for indicating a shortage of power in the electrical transformation zone is set as the second voltage threshold and a value for indicating whether the capacitor unit 9 can supplement a power shortage in the electrical transformation zone is set as the second SOC threshold. In this case, when the feeding voltage falls below the second voltage threshold and the SOC of the capacitor unit 9 exceeds the second SOC threshold, the control unit 13 can control the first power conversion unit such that it supplies power from the capacitor unit 9 to the feeder 6.

With such control, during a period in which the capacitor unit 9 maintains an SOC that enables supplementation of a power shortage in the electrical transformation zone, the power shortage in the electrical transformation zone can be supplemented with the surplus regenerative power with which the capacitor unit 9 has been charged. Accordingly, fluctuations in the voltage of the feeder 6 can be more stable.

A specific operation example of the station-building power supply device 100 according to the present embodiment is described next with reference to FIGS. 2(a-d). FIGS. 2(a-d). are diagrams illustrating an example of time charts of the station-building power supply device according to the present embodiment.

FIG. 2(a) illustrates transition of the feeding voltage and FIG. 2(b) illustrates transition of charge/discharge power of the capacitor unit 9. FIG. 2(c) illustrates transition of the SOC of the capacitor unit 9, and FIG. 2(d) illustrates power consumption by the station loads 4. The example illustrated in FIGS. 2(a-d). is an example in which a constant power charging method is used as a method of charging the capacitor unit 9. In the illustrated example, discharging from the capacitor unit 9 to the feeder 6 is also performed at a constant power. The present invention is not limited by the method of charging the capacitor unit 9 or the method of discharging from the capacitor unit 9 to the feeder 6.

In the period from a time t1 to a time t2, the feeding voltage is within a range from the second voltage threshold to the first voltage threshold (FIG. 2(a)) and the SOC of the capacitor unit 9 is above the first SOC threshold (FIG. 2(c)). Therefore, the control unit 13 operates the second power conversion unit 12 such that it turns ON discharging from the capacitor unit 9 to the station loads 4. At that time, the control unit 13 controls the second power conversion unit 12 such that it causes the amount of power supplied from the capacitor unit 9 to the station loads 4 to be substantially constant (FIG. 2(b)).

When the SOC of the capacitor unit 9 gradually decreases and the SOC of the capacitor unit 9 falls below the first SOC threshold at the time t2 (FIG. 2(c)), the control unit 13 gradually decreases the amount of power supplied from the capacitor unit 9 to the station loads 4, causing the power amount supplied from the capacitor unit 9 to the station loads 4 to be substantially zero at a time t2', and stops the operation of the second power conversion unit 12 such that the discharging from the capacitor unit 9 to the station loads 4 is turned off.

When the feeding voltage exceeds the first voltage threshold at a time t3 (FIG. 2(a)), the control unit 13 operates the first power conversion unit 11 such that it turns ON charging from the feeder 6 to the capacitor unit 9. When the SOC of the capacitor unit 9 thereafter exceeds the first SOC threshold at a time t3', the control unit 13 operates the second power conversion unit 12 such that it turns ON discharging from the capacitor unit 9 to the station loads 4 to gradually increase the power amount supplied from the capacitor unit 9 to the station loads 4 and controls the second power conversion unit 12 such that it causes the power amount supplied from the capacitor unit 9 to the station loads 4 to be substantially constant after a time t3" (FIG. 2(b)).

In the period from the time t3 to time t4, the SOC of the capacitor unit 9 increases due to charging from the feeder 6 to the capacitor unit 9 (FIG. 2(c)). Meanwhile, the feeding value becomes lower (indicated by a solid line in FIG. 2(a)) than that in a case where the charging to the capacitor unit 9 is not performed (indicated by a dashed line in FIG. 2(a)).

When the feeding voltage falls below the first voltage threshold at the time t4 (FIG. 2(a)), the control unit 13 stops the operation of the first power conversion unit 11 so as to turn OFF the charging from the feeder 6 to the capacitor unit 9.

In the period from a time t5 to time t6, while the feeding voltage is below the first voltage threshold, discharging from the capacitor unit 9 to the feeder 6 is not performed because the SOC of the capacitor unit 9 is below the second SOC threshold. That is, in the period from the time t4 to time t7, only discharging from the capacitor unit 9 to the station loads 4 is performed and thus the SOC of the capacitor unit 9 gradually decreases (FIG. 2(c)).

When the feeding voltage exceeds the first voltage threshold at the time t7 (FIG. 2(a)), the control unit 13 operates the first power conversion unit 11 such that it turns ON charging from the feeder 6 to the capacitor unit 9.

In the period from the time t7 to time t8, the charging from the feeder 6 to the capacitor unit 9 is performed similar to in the period from the time t3 to the time t4 and thus the SOC of the capacitor unit 9 increases (FIG. 2(c)). The feeding voltage accordingly becomes lower (indicated by a solid line in FIG. 2(a)) than that in a case where the charging of the capacitor unit 9 is not performed (indicated by a dashed line in FIG. 2(a)).

When the feeding voltage falls below the first voltage threshold at the time t8 (FIG. 2(a)), the control unit 13 stops the operation of the first power conversion unit 11 such that it turns OFF the charging from the feeder 6 to the capacitor unit 9.

In the period from the time t8 to a time t9, the feeding voltage is within the range from the second voltage threshold to the first voltage threshold (FIG. 2(a)) and the SOC of the capacitor unit 9 is above the first SOC threshold (FIG. 2(c)). Therefore, only discharging from the capacitor unit 9 to the station loads 4 is performed and thus the SOC of the capacitor unit 9 gradually decreases (FIG. 2(c)).

When the feeding voltage falls below the second voltage threshold at the time t9 (FIG. 2(a)), the control unit 13 operates the first power conversion unit 11 to turn ON discharging from the capacitor unit 9 to the feeder 6.

In the period from the time t9 to time t10, the feeding voltage is below the second voltage threshold (FIG. 2(a)) and the SOC of the capacitor unit 9 is above the second SOC threshold (FIG. 2(c)) unlike in the period from the time t5 to the time t6. Therefore, the discharging from the capacitor unit 9 to the station loads 4 and discharging from the capacitor unit 9 to the feeder 6 are performed simultaneously, so that the SOC of the capacitor unit 9 decreases more (FIG. 2(c)) and the feeding voltage becomes higher (indicated by a solid line in FIG. 2(a)) than that in a case where discharging to the capacitor unit 9 is not performed (indicated by a dashed line in FIG. 2(a)).

When the SOC of the capacitor unit 9 falls below the second SOC threshold at the time t10 (FIG. 2(c)), the control unit 13 stops the operation of the first power conversion unit 11 to turn OFF the discharging from the capacitor unit 9 to the feeder 6.

In the period from the time t10 to a time t11, while the feeding voltage is below the first voltage threshold (FIG. 2(a)), discharging from the capacitor unit 9 to the feeder 6 is not performed because the SOC of the capacitor unit 9 is below the second SOC threshold (FIG. 2(C)). That is, in the period from the time t10 to a time t12, only the discharging from the capacitor unit 9 to the station loads 4 is performed similar to in the period from the time t4 to the time t7 and thus the SOC of the capacitor unit 9 gradually decreases (FIG. 2(c)).

When the feeding voltage exceeds the first voltage threshold at the time t12 (FIG. 2(a)), the control unit 13 operates the first power conversion unit 11 to turn ON charging from the feeder 6 to the capacitor unit 9.

After the time t12, charging from the feeder 6 to the capacitor unit 9 is performed similar to in the period from the time t3 to the time t4, so that the SOC of the capacitor unit 9 increases (FIG. 2(c)) and the feeding voltage becomes lower (indicated by a solid line in FIG. 2(a)) than that in a case where the charging to the capacitor unit 9 is not performed (indicated by a dashed line in FIG. 2(a)).

In this way, in the example illustrated in FIG. 2, surplus regenerative power, which has been charge in the capacitor unit 9 in a period in which the feeding voltage is above the first voltage threshold, is supplied to the station loads 4 at a substantially constant power amount, except for a period in which the SOC of the capacitor unit 9 is below the first SOC threshold.

A conventional configuration not including a capacitor unit that stores therein surplus regenerative power is described next. FIGS. 3a-3b are diagrams illustrating an example of time charts of a conventional station-building power supply device not including a capacitor unit that stores therein surplus regenerative power. FIG. 3(a) illustrates transition of a feeding voltage and FIG. 3(b) illustrates power consumption of station loads.

In the conventional configuration illustrated in FIGS. 3a-3b, only when the feeding voltage exceeds a voltage threshold, that is, only when surplus regenerative power occurs, the power from a feeder is supplied to the station loads and thus the amount of power supplied from an AC system fluctuates intermittently. Accordingly, even when the power supplied from the feeder is equal to or below the power consumption amount of the station loads, the total power amount of the AC system fluctuates intermittently, which may cause fluctuations in the AC system voltage.

In the configuration according to the present embodiment, the surplus regenerative power occurring intermittently is stored in the capacitor unit 9 and power supplied continuously from the AC system 1 to the station loads 4 is supplemented with the surplus regenerative power stored in the capacitor unit 9, in a period in which the capacitor unit 9 maintains an SOC that enables discharging. Therefore, the surplus regenerative power can be effectively used while fluctuations in the total power amount of the AC system 1 are suppressed.

As described above, the station-building power supply device according to the present embodiment includes the capacitor unit that stores therein surplus regenerative power in an electrical transformation zone; the first power conversion unit that performs DC/DC power conversion in both directions between the feeder and the capacitor unit; and the second power conversion unit that converts DC power supplied from the capacitor unit to AC power to be supplied to the station loads. A voltage threshold (a first voltage threshold) for the feeding voltage and an SOC threshold (a first SOC threshold) for the SOC of the capacitor unit are set; a value that indicates occurrence of surplus regenerative power in the electrical transformation zone is set as the first voltage threshold; and a value that indicates whether the capacitor unit can discharge is set as the first SOC threshold. The first power conversion unit is controlled so as to supply power from the feeder to the capacitor unit to perform charging of the capacitor unit when the feeding voltage exceeds the first voltage threshold; and the second power conversion unit is controlled so as to supply power from the capacitor unit to the station loads when the SOC of the capacitor unit exceeds the first SOC threshold. Therefore, each time generation of surplus regenerative power in the electrical transformation zone occurs, the capacitor unit is charged with the surplus regenerative power, and power supplied continuously from the AC system to the station loads can be supplemented with the surplus regenerative power with which the capacitor unit has been charged in a period in which the capacitor unit maintains an SOC that enables discharging. Accordingly, the surplus regenerative power can be effectively used while fluctuations in the voltage of the feeder and fluctuations in the amount of power supplied from the AC system are suppressed.

The second power conversion unit is controlled so as to cause the amount of power supplied from the capacitor unit to the station loads to be substantially constant. Accordingly, the amount of power supplied from the AC system can be more stable.

Furthermore, the second voltage threshold smaller than the first voltage threshold is provided for the feeding voltage, and the second SOC threshold larger than the first SOC threshold is provided for the SOC of the capacitor unit. A value that indicates a shortage of power in the electrical transformation zone is set as the second voltage threshold, and a value that indicates whether the capacitor unit can supplement a power shortage in the electrical transformation zone is set as the second SOC threshold. When the feeding voltage falls below the second voltage threshold and the SOC of the capacitor unit exceeds the second SOC threshold, the first power conversion unit is controlled such that the power is supplied from the capacitor unit to the feeder. Therefore, in a period in which the capacitor unit maintains an SOC that enables supplementation of a power shortage in the electrical transformation zone, the power shortage in the electrical transformation zone can be supplemented with surplus regenerative power with which the capacitor unit has been charged. Accordingly, voltage fluctuations of the feeder can be more stable.

The configuration described in the above embodiment is only an example of the contents of the present invention. The configuration can be combined with other well-known techniques, and it is needless to mention that the present invention can be configured while modifying it without departing from the scope of the invention, such as omitting a part thereof.

REFERENCE SIGNS LIST

1 AC system, 2 station building, 3 transformer, 4, 4-1, 4-2, . . . , 4-$n$ station load, 5 train, 6 feeder, 7 rail, 8 feeding-voltage detection unit, 9 capacitor unit, 10 SOC detection unit, 11 first power conversion unit, 12 second power conversion unit, 13 control unit, 21 bidirectional DC/DC converter, 22 inverter, 23 transformer, 100 station-building power supply device.

The invention claimed is:

1. A station-building power supplier that supplies power to a station load using both AC power supplied from an AC system and surplus regenerative power generated by trains, the station-building power supplier comprising:
  a feeding-voltage detector that detects a feeding voltage;
  an SOC (State Of Charge) detector that detects an SOC of a capacitor that stores therein the surplus regenerative power;
  a first power converter that performs DC/DC power conversion in both directions between a feeder and the capacitor;
  a second power converter that converts DC power supplied from the capacitor to AC power and supplies the AC power to the station load; and
  a controller that controls the first power converter and the second power converter on the basis of the feeding voltage and the SOC, wherein
  the controller
    controls the first power converter such that power is supplied from the feeder to the capacitor when the feeding voltage exceeds a predetermined first voltage threshold,
    controls the second power converter such that power is supplied from the capacitor to the station load when the SOC exceeds a predetermined first SOC threshold, and
    controls the first power converter such that power is supplied from the capacitor to the feeder when the feeding voltage falls below a second voltage threshold that is smaller than the first voltage threshold and the SOC exceeds a second SOC threshold that is larger than the first SOC threshold.

2. The station-building power supplier according to claim 1, wherein
  the controller controls the second power converter such that an amount of power supplied from the capacitor to the station load is constant.

3. A station-building power supplier that supplies power to a station load using both AC power supplied from an AC system and surplus regenerative power from trains, the station-building power supplier comprising:
  a feeding-voltage detector that detects a feeding voltage;
  a first power converter that performs DC/DC power conversion in both directions between a feeder and a capacitor that stores therein the surplus regenerative power;
  a second power converter that converts DC power supplied from the capacitor to AC power and supplies the AC power to the station load;
  an SOC detector that detects an SOC of the capacitor; and
  a controller that controls the first power converter and the second power converter on the basis of the feeding voltage and the SOC, wherein
  the controller
    controls the first power converter such that power is supplied from the feeder to the capacitor when the feeding voltage exceeds a predetermined first voltage threshold;
    controls the second power converter such that power is supplied from the capacitor to the station load when the SOC exceeds a predetermined first SOC threshold; and
    controls the second power converter such that power supplied from the capacitor to the station load is reduced during a predetermined time period when the SOC becomes lower than the predetermined first SOC threshold.

4. A station-building power supplier that supplies power to a station load using both AC power supplied from an AC system and surplus regenerative power generated by trains, the station-building power supplier comprising:
  a feeding-voltage detector that detects a feeding voltage;
  an SOC (State of Charge) detector that detects an SOC of a capacitor that stores therein the surplus regenerative power;
  a first power converter that performs the DC/DC power conversion in both directions between a feeder and the capacitor;

a second power converter that converts DC power supplied from the capacitor to AC power and supplies the AC power to the station load; and a controller that controls the first power converter and the second power converter on the basis of the feeding voltage and the SOC, wherein the controller controls the second power converter such that power is supplied from the capacitor to the station load when the SOC exceeds a predetermined first SOC threshold, and controls the first power converter such that power is supplied from the capacitor to the feeder when the SOC exceeds a predetermined second SOC threshold that is larger than the predetermined first SOC.

5. A station-building power supplier that supplies power to a station load using both AC power supplied from an AC system and surplus regenerative power generated by trains, the station-building power supplier comprising:

a feeding-voltage detector that detects a feeding voltage;

an SOC (State Of Charge) detector that detects an SOC of a capacitor that stores therein the surplus regenerative power;

a first power converter that performs DC/DC power conversion in both directions between a feeder and the capacitor;

a second power converter that converts DC power supplied from the capacitor to AC power and supplies the AC power to the station load; and a controller that controls the first power converter and the second power converter on the basis of the feeding voltage and the SOC, wherein the controller controls the second power converter such that a fixed amount of power is supplied from the capacitor to the station load when the SOC exceeds a predetermined first SOC threshold.

\* \* \* \* \*